(12) United States Patent
Johnson

(10) Patent No.: US 9,386,885 B1
(45) Date of Patent: Jul. 12, 2016

(54) FOOD CONTAINER ORGANIZER

(71) Applicant: Douglas S. Johnson, Huntington Beach, CA (US)

(72) Inventor: Douglas S. Johnson, Huntington Beach, CA (US)

(*) Notice: Subject to any disclaimer, the term of this patent is extended or adjusted under 35 U.S.C. 154(b) by 19 days.

(21) Appl. No.: 14/803,286

(22) Filed: Jul. 20, 2015

(51) Int. Cl.
| | |
|---|---|
| *A47J 47/16* | (2006.01) |
| *B65D 21/02* | (2006.01) |
| *B65D 43/02* | (2006.01) |
| *B65D 1/36* | (2006.01) |
| *B65D 85/62* | (2006.01) |

(52) U.S. Cl.
CPC . *A47J 47/16* (2013.01); *B65D 1/36* (2013.01); *B65D 21/02* (2013.01); *B65D 43/02* (2013.01); *B65D 85/62* (2013.01)

(58) Field of Classification Search
CPC ........... A47J 47/16; B65D 43/02; B65D 1/36; B65D 85/62; B65D 21/02; A47B 87/0207
USPC ......... 220/23.86, 23.89, 23.88; 206/565, 499, 206/505, 509, 514, 515; 108/91, 92; 211/49.1, 41.2, 41.3, 85.1, 71.01, 74
See application file for complete search history.

(56) References Cited

U.S. PATENT DOCUMENTS

| | | | | |
|---|---|---|---|---|
| 109,739 | A * | 11/1870 | Huntly ................... | B65D 5/001 206/499 |
| 1,704,047 | A * | 3/1929 | Lippert ................... | A47F 1/065 211/10 |
| 5,439,108 | A * | 8/1995 | Lackie ................... | B25H 3/023 206/373 |
| 7,216,769 | B2 * | 5/2007 | Palder ................ | B65D 21/0233 211/49.1 |
| 2014/0262922 | A1 * | 9/2014 | Johnson ................... | B25H 3/06 206/565 |

\* cited by examiner

*Primary Examiner* — Fenn Mathew
*Assistant Examiner* — Don M Anderson
(74) *Attorney, Agent, or Firm* — Morland C. Fischer

(57) ABSTRACT

A compact food container organizer by which variously sized food containers and their variously sized lids are stored and sorted in a neat and orderly manner. The organizer has stacks of pedestals lying side-by-side one another and attached to a flat support base. Each stack has one or more preferably disk-shaped pedestals lying one above the other over the base. The diameters of the successive ones of disk-shaped pedestals vary so that different food containers having different sizes can first be inverted and then positioned over the top of and around the correspondingly sized pedestals. A plurality of lid baskets having different sizes are attached to the support base to accommodate therewithin the variously sized lids that cover the food containers.

5 Claims, 2 Drawing Sheets

FOOD CONTAINER ORGANIZER

BACKGROUND OF THE INVENTION

1. Field of the Invention

This invention relates to a food container organizer having pluralities of variously-sized pedestals and lid baskets mounted on a flat support base by which corresponding pluralities of variously-sized food containers and their lids are efficiently stored and sorted by size. By virtue of the organizer herein disclosed, the food containers and their lids can be grouped in an orderly, neat and compact arrangement to enable convenient and selective access thereto on an as-needed basis.

2. Background Art

Non-breakable food containers have long been used in which to store, refrigerate and transport a variety of food items. A lid is commonly associated with each food container. The food containers and their lids are manufactured in a variety of sizes to accommodate correspondingly different volumes and types of food.

When the food containers are not being used, it is preferable to store them in an out-of-the-way location in a kitchen or a similar facility until they are needed. Where many food container and lids must be available prior to their use (such as in the case of a residential kitchen or a larger large food distribution center), a large amount of space is often consumed. Moreover, the random storage of a large number of individual food containers having different sizes may be disorganized and inconvenient especially in the case where a food container and its matching lid having a particular size must be quickly located among many other containers.

Therefore, what would be desirable is an efficient food container organizer for storing a variety of variously-sized food containers and their matching lids such that the containers and the lids can be grouped together according to their size in an orderly, neat and compact arrangement to enable convenient and selective access thereto on an as-needed basis.

One example of a food container organizer which achieves this goal is described in my patent application Ser. No. 14/727,232 filed Jun. 1, 2015.

SUMMARY OF THE INVENTION

In general terms, a compact food container organizer is disclosed by which variously-sized food containers and their lids are stored and sorted by size. The food container organizer includes stacks of (e.g., disk-shaped) pedestals attached to a flat support base. Each stack includes one or more pedestals located one above the other and having successively decreasing diameters relative to the base. One or more food containers are inverted and then positioned over the top of and around a particular one of the pedestals depending upon the diameter of the particular pedestal and the size of the open top of the food container. In an alternate preferred embodiment, a one piece tiered (i.e., stepped) stack is provided having a series of (disk-shaped) pedestals with successively decreasing diameters lying one above the other and molded to the support base. A plurality of lid baskets are attached to the support base adjacent the pedestals. The lid baskets are preferably rectangular in shape and have different sizes to accommodate therewithin lids of different size that are used to cover the food containers.

The food container organizer enables a variety of food containers and their lids to be grouped according to their size in an orderly, neat and compact arrangement on the support base so as to be ideal for storage in a pull-out drawer or on a pantry shelf. Accordingly, convenient and selective access is available on an as-needed basis to any of the food containers lying over any of the pedestals as well as to any of the lids located within the lid baskets.

DESCRIPTION OF THE PREFERRED EMBODIMENT

Figure 1:
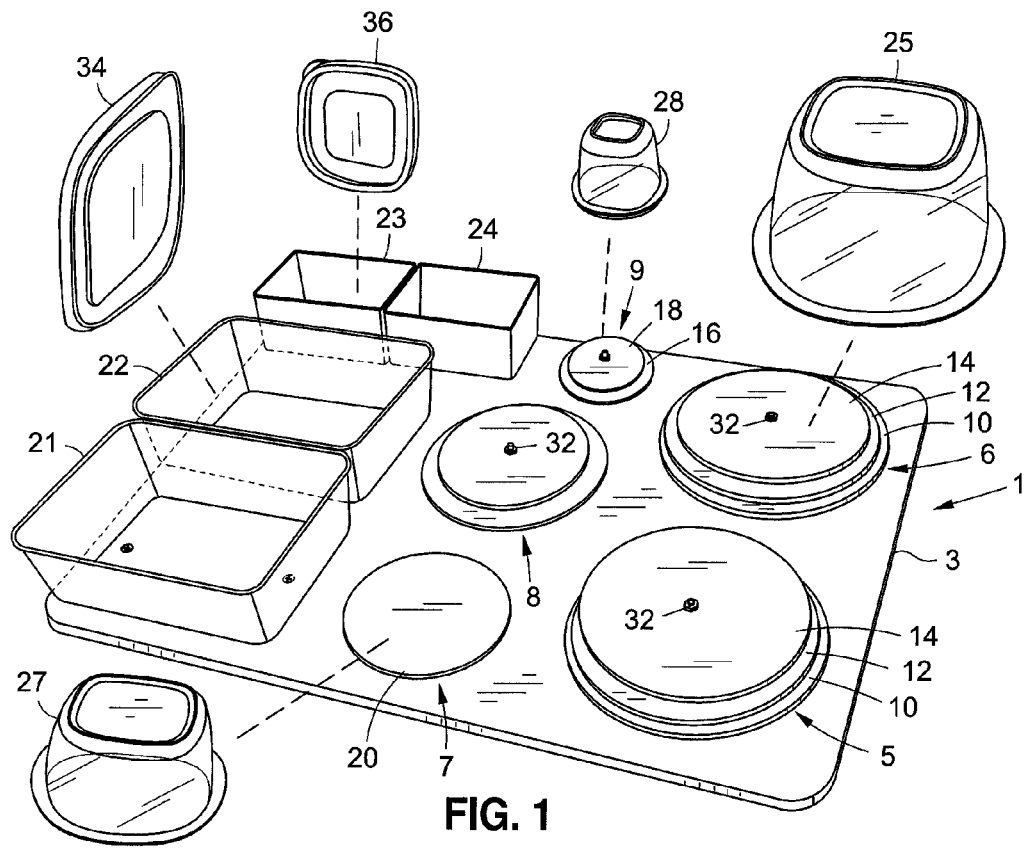
FIG. 1 is a perspective illustration of a compact food container organizer according to a preferred embodiment of this invention having stacks of variously sized pedestals and lid baskets mounted on a support base for holding and storing stacks of variously-sized food containers and their lids.
Figure 2:
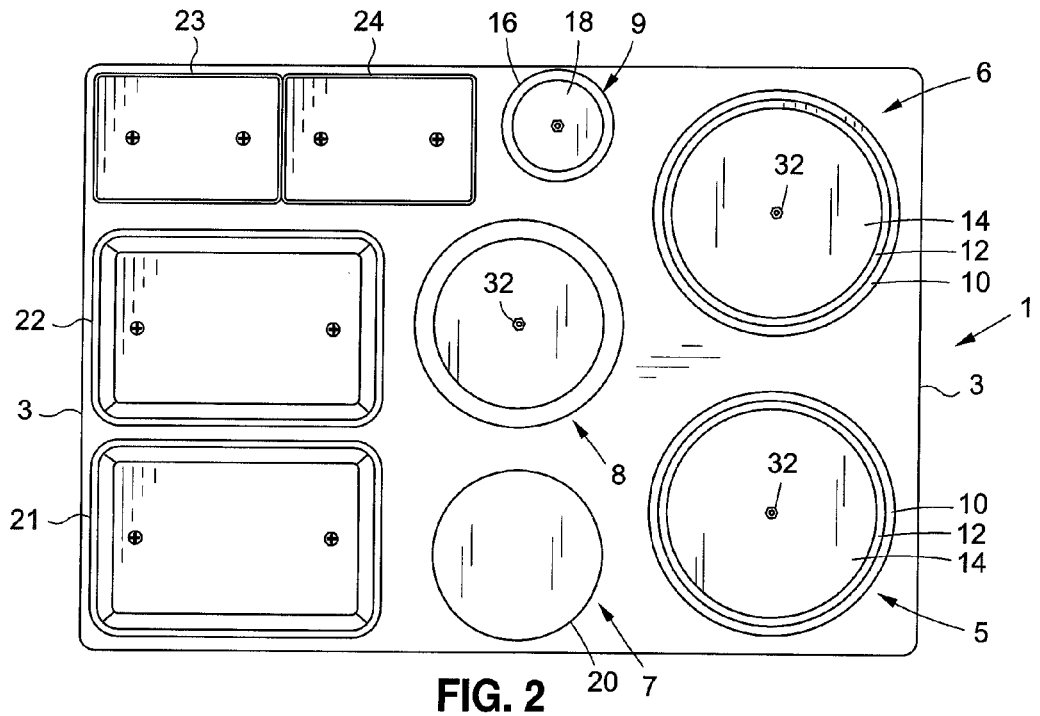
FIG. 2 is a top plan view of the compact food container organizer shown in FIG. 1.

A preferred embodiment for a compact food container organizer 1 in accordance with the present invention is disclosed while referring initially to FIGS. 1 and 2 of the drawings. As will be explained hereinafter, the food container organizer 1 is particularly adapted to provide an orderly, neat and easily-manageable platform upon which to stack and sort a variety of different conventional food containers having a variety of different shapes. By way of example only, the food containers to be stacked and sorted on the organizer 1 are made from plastic and are commercially available from different manufacturers under the trademarks RUBBERMAID®, TUPPERWARE®, and others.

The food container organizer 1 includes a flat support base 3 that is preferably manufactured from a durable material such as acrylic or the like. The support base 3 is ideally sized to fit within a large pull-out drawer or on a shelf in a pantry so that the food containers being stacked on the organizer will be readily available to users.

Stacks of individual pedestals 5-9 are connected side-by-side one another to the support base 3 by means of fasteners 32 (e.g., threaded nuts and bolts). Each of the individual pedestals that lies one over the other from each of the stacks 5-9 preferably has a disk-shaped configuration so as to be able to accommodate both cylindrical and rectangular food containers. The number of individual pedestals in each of the stacks 5-9 thereof can vary from one stack to another. By way of a preferred embodiment, each stack 5-9 ideally includes between one to five pedestals attached one above the other to support base 3 in order to accommodate most conventional food containers.

To maximize the flexibility of the food container organizer 1, each of the pedestals from each stack 5-9 has a different size. In the case where the pedestals are disk-shaped in the manner illustrated in FIGS. 1 and 2, each upper disk-shaped pedestal which lies above an adjacent lower disk-shaped pedestal has a smaller diameter than the diameter of the lower disk-shaped pedestal. By way of example only, identical stacks 5 and 6 each include three disk-shaped pedestals 10, 12 and 14. The lowermost pedestal 10 which lays flush against the support base 3 has the largest diameter (e.g., 3.25 inches). The middle pedestal 12 from each of the stacks 5 and 6 which lies over and on top of the lowermost pedestal 10 has an intermediate diameter (e.g., 3.0 inches). The uppermost pedestal 14 which lies over and on top of the middle pedestal 12 has the smallest diameter (e.g., 2.75 inches).

By way of another example, the stack 9 has a total of two disk-shaped pedestals 16 and 18 laying one above the other. The lowermost pedestal 16 which lays flush against the support base 3 has the larger diameter (e.g., 1.25 inches). The uppermost pedestal 18 which lies over and on top of the lowermost pedestal 16 has the smaller diameter (e.g., 1.0 inch). By way of yet another example, the stack 7 can be limited to just a single disk-shaped pedestal 20. In this case, the single pedestal 20 lies flush against the support base 3 and has a different diameter (e.g., 2.0 inches) over which a different food container can be positioned.

Seated on top of the support base 3 of the food organizer 1 adjacent the stack of pedestals 5-9 are a plurality of lid baskets 21-24. The lid baskets 21-24 are preferably attached to the base 3 by means of fasteners extending through the baskets and into the base. These fasteners may be the same as those used to attach to stacks of pedestals 5-9 to the support base 3. Like the stack of pedestals, the lid baskets 21-24 have different sizes to accommodate the lids which cover the open mouths of the food containers that are to be stacked on the organizer 1.

Each of the lid baskets 21-24 preferably has a rectangular shape to be able to receive a stack of both rectangular and/or round container lids (e.g., 34 and 36 of FIG. 1). By way of example, a first pair of lid baskets 21 and 22 are positioned side-by-side and have an identical length of seven inches. The pair of lid baskets 21 and 22 may also have an identical (e.g., five inches) or a different width.

A second pair of lid baskets 23 and 24 are positioned end-to-end and have an identical length of, for example, three inches. While a pair of identical lid baskets 23 and 24 is shown, only a single lid basket need be connected to the support base 3 adjacent the larger lid baskets 21 and 22. However, it is to be understood that the locations of the lid baskets 21-24 relative to each other and to the stacks of pedestals 5-9 is a matter of convenience and not to be regarded as a limitation of this invention. By virtue of the addition of smaller (relative to the size of the lid baskets 21 and 22) lid baskets 23 and 24, the organizer 1 will be advantageously capable of storing one or more stacks of correspondingly small container lids. Moreover, the container lids 34 and 36 can be stacked in different directions along the length of the first pair of lid baskets 21 and 22 and along the width of the second pair of lid baskets 23 and 24 depending upon the size of the lids.

Figure 3:
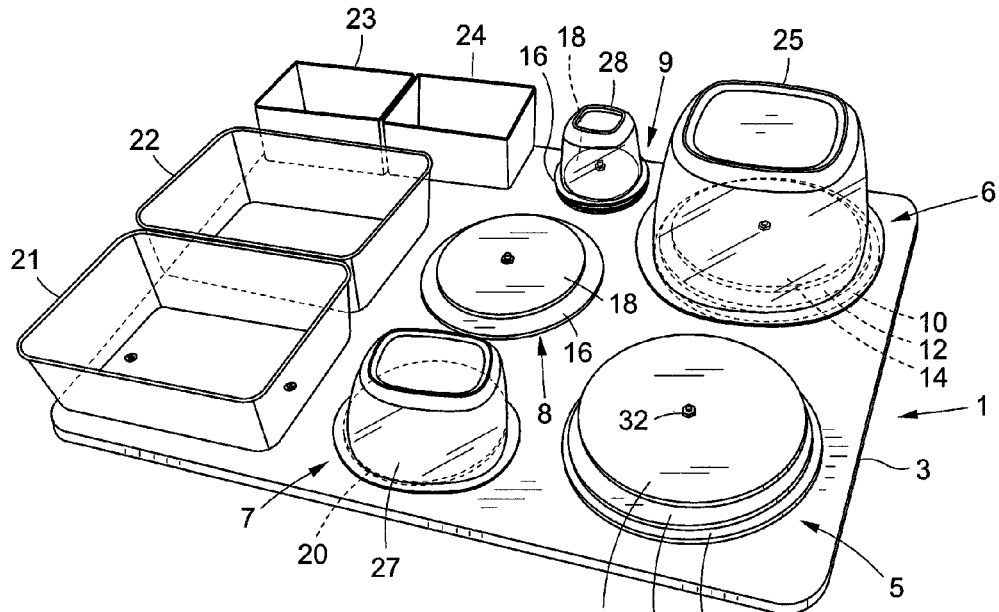
FIG. 3 shows the compact food organizer creating an orderly, neat and easily-manageable platform wherein inverted stacks of the variously sized food containers are positioned over the top of and around particular pedestals from the stacks of pedestals shown in FIGS. 1 and 2 depending upon the size of the pedestals and the size of the food containers.

Use of the compact food container organizer 1 of this invention is now described for storing and sorting stacks of food containers and their lids while referring concurrently to FIGS. 1-3 of the drawings. A first relatively large food container 25 is shown positioned upright and inverted over the top of and around a particular one of the pedestals 10 from one of the stacks of pedestals 6. The diameter of the particular pedestal 10 over which the container is positioned has a diameter which corresponds to the size of the open top of the container 25. Had it had a smaller top, then the container 25 could instead have been positioned over and around one of the other pedestals 12 or 14 from the stack 6 having a smaller diameter.

As will be explained in greater detail when referring to FIG. 4, either a single one or a plurality of upright food containers may be inverted and stacked one above the other over the top of and around any of the pedestals from any of the stacks 5-9 thereof depending upon the diameter of the pedestal and the size of the open top which lies opposite the closed bottom of the container. In the case of the stack 7, a single smaller upright container 27 (relative to the size of the container 25) is inverted and positioned over and around the single pedestal 20, such that the container is seated upon the support base 3. In the case of the stack 9, a still smaller upright container 28 (relative to the size of the container 27) is inverted and positioned over and around the uppermost pedestal 18 thereof so as to be seated upon the lowermost pedestal 16.

Figure 4:
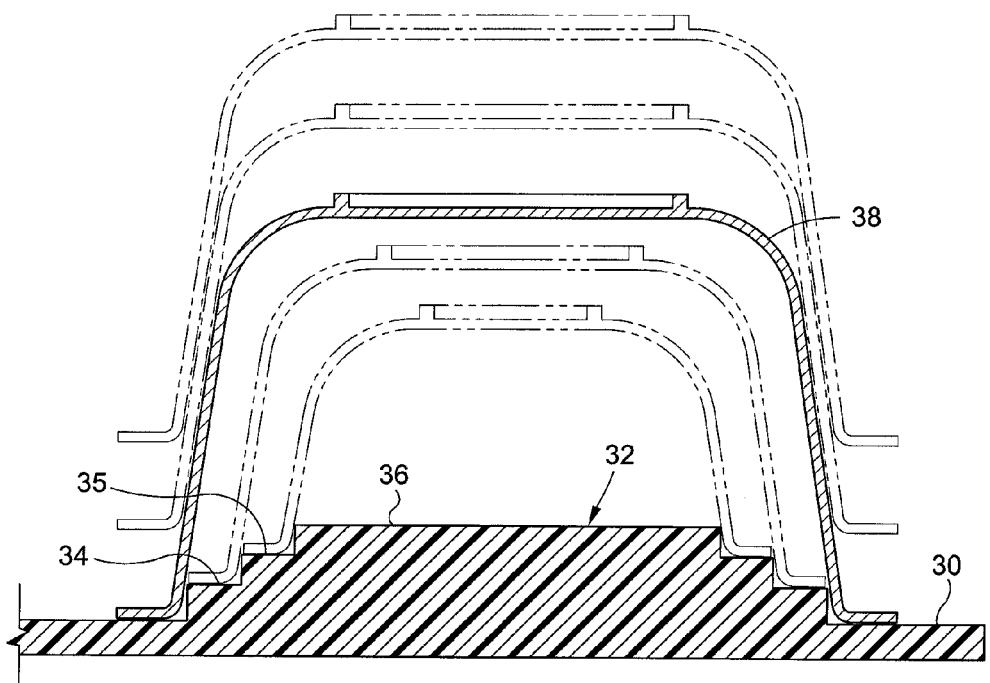
FIG. 4 is a cross-section which shows an alternate embodiment of this invention wherein a one-piece stack of variously sized pedestals is integrally molded to a support base by means of a vacuum forming process.

Turning now to FIG. 4 of the drawings, an alternate embodiment of this invention is shown where the food container organizer shown in FIGS. 1-3 is manufactured from a single piece of plastic according to a conventional vacuum forming (i.e., molding) process. More particularly, rather than each of the stacks of pedestals 5-9 of FIGS. 1-3 having individual pedestals laid one upon the other and mounted atop the flat support base 3 by fasteners 32 extending therebetween, the flat support base 30 of FIG. 4 is molded to each of the stacks (only one of which 32 being shown) of the food organizer. Therefore, the aforementioned fasteners may be entirely eliminated.

In the case of FIG. 4, each stack 32 of the one piece organizer is tiered or stepped and contains one or more (e.g., disk-shaped) pedestals (e.g., 34, 35 and 36) having successively decreasing sizes (i.e., diameters) relative to the base 30 and being integrally connected to one another and to the support base 30. As in the case of the food container organizer 1 shown in FIGS. 1-3, stacks of identical or different sized food containers (e.g., 38) can be inverted and then positioned over the top of and around any one or more of the correspondingly sized pedestals (e.g., 34) from the stack 32 thereof.

Some or all of the pedestals and the lid baskets shown in FIGS. 1-4 can be used for storage purposes depending upon the number and size of the food containers and their lids to be stacked on and sorted by the food container organizer. In this regard, it may be appreciated that both the containers and the lids are grouped according to their size in an orderly, neat and compact configuration to enable convenient and selective access thereto on an as-needed basis.

The invention claimed is:

1. A combination comprising:
   first and second food containers, each of said first and second food containers having a closed bottom and an open top, the open tops of said first and second food containers having respective first and second sizes which are different from one another; and
   an organizer for storing and sorting said first and second food containers according to the size of their open tops, said organizer including:
   a base; and
   a stack including first and second round pedestals, the first and second round pedestals of said stack having respective first and second diameters which are different from one another;
   the first of said round pedestals which has the first diameter laying above said base and the second of said round pedestals which has the second diameter lying on said first pedestal, wherein the first diameter of said first round pedestal is larger than the second diameter of said second round pedestal, and
   wherein the first size of the open top of said first food container is larger than the second size of the open top of said second food container, such that said first food container is able to lie over and surround the first pedestal in the stack of first and second round pedestals and said second food container is able to lie over and surround the second pedestal in the stack of first and second round pedestals while at the same time sitting on said first round pedestal.

2. The combination recited in claim 1, further comprising a fastener extending through the first and second round pedestals of said stack to said base to hold said second round pedestal on said first round pedestal above said base.

3. The combination recited in claim 1, wherein the first and second pedestals of said stack are integrally connected to each other and to said base without the use of a fastener.

4. The combination recited in claim 1, further comprising a plurality of lids to cover the open tops of said first and second food containers; and at least one lid container attached to said base and being sized to accommodate therewithin said plurality of lids.

5. The combination recited in claim 1, further comprising first and second lids having first and second sizes which are different from one another to correspond with the first and second sizes of the open tops of said first and second food containers; and first and second lid containers attached to said base to accommodate therewithin respective ones of said first and second lids.

* * * * *